3,441,609
**AMMONIA-EPICHLOROHYDRIN
REACTION PRODUCTS**
John B. McKelvey, Ruth R. Benerito, and Ralph J. Berni, New Orleans, La., and Beverly G. Burgis, Clearwater, Fla., assignors to the United States of America as represented by the Secretary of Agriculture
No Drawing. Original application Mar. 24, 1964, Ser. No. 354,479, now Patent No. 3,351,420, dated Nov. 7, 1967. Divided and this application July 7, 1967, Ser. No. 665,941
Int. Cl. C07c 85/00, 87/00
U.S. Cl. 260—583                2 Claims

ABSTRACT OF THE DISCLOSURE

A crosslinking reagent for cellulose is prepared by aging a solution consisting of a 1:3 mole ratio of ammonia and epichlorohydrin dissolved in methanol at room temperature for at least 1800 hours. This reagent is capable of imparting both wet and dry crease resistance to a cellulose fabric treated therewith.

---

This application is a division of application Ser. No. 354,479 filed Mar. 24, 1964, and now Patent No. 3,351,420.

A nonexclusive, irrevocable, royalty-free license in the invention here described, throughout the world for all purposes of the United States Government, with the power to grant sublicences for such purposes, is hereby granted to the Government of the United States of America.

The purpose of the present invention is to impart dry and wet crease resistance to cotton fabrics by the use of reaction products resulting from the ammonia-epichlorohydrin reaction. If an alcoholic solution of anhydrous ammonia and epichchlorohydrin at a 1:3 molar ratio is allowed to age slowly at room temperature, the ionic chloride content rises slowly and the pH of the solution decreases slowly. After several days, the ionic chloride content rises to about 1%, and after 2–3 months, it increases to 6–7%. After several months, a final pH is approximately 6. Depending on the time of ageing the methanolic solutions, the resiliency of the fabrics finished with the reaction products varies. If a freshly prepared alcoholic solution of ammonia and epichlorohydrin, or a solution which has been standing at room temperature for only a few days is used, only wet crease resistance is imparted to the fabrics. However, if an alcoholic solution of ammonia and epichlorohydrin which has been standing at room temperature for several months is used, the finished fabric possesses both dry and wet crease recovery. Use of heat in either a refluxing or rotary evaporation method applied to the alcoholic solutions brings about an increase in the ionic chloride content, but use of such heated solutions in the finishing of fabrics does not result in dry crease resistant fabrics.

To impart the desired properties of both dry and wet crease resistance, fabrics are treated by a 2-step process. In the first step, the fabric is treated with an aqueous solution containing 10–20% by weight of the active ingredients obtained for a methanolic solution which has been aged from 2–3 months at room temperature. An ageing time of 1800 hours at room temperature is preferred. The fabric is twice padded to approximately 90% wet pick-up, oven-dried for several minutes at 95–150° C. (preferably at the lower temperature range). In the second step, the fabric is padded to approximately 90% wet pick-up with aqueous NaOH of concentration in excess of that required to set the epoxide free. Usually, 5–10% aqueous NaOH solutions can be used when 10–20% solutions of active ingredients are used respectively in the first step. The fabrics are then oven-cured at approximately 110° C.

Example 1

A methanolic solution of epichlorohydrin and ammonia (3:1 mole ratio) which had been standing at room temperature for a day was diluted with water to give 20% active ingredients solution for use in a 2-step process. It was used to twice pad an 80 x 80 cotton print cloth to a wet pick-up of 90–95%. The fabrics were then oven-dried from 3 minutes at 150° C. and quickly padded in a second step with 20% aqueous NaOH solution and cured 5 to 10 minutes at 110° C. The excess alkali and reagents were washed out with tap water, then dilute acetic acid, and finally with distilled water.

| Time of drying, min. | Wt. gain percent | Crease recovery angles, deg. (W+F) | |
|---|---|---|---|
| | | Dry | Wet |
| 3 | 5.8 | 147 | 255 |
| 5 | 5.1 | 122 | 232 |
| 10 | 6.5 | 132 | 257 |
| Control | | 193 | 186 |

Example 2

Cotton fabric treated as in Example 1, except that 10% aqueous NaOH was used in the second step, and curing time was 10 minutes at 110° C. Fabric of weight gain 5.4% and possessing dry recovery angles of 204 and wet recovery angle of 249 (W+F)° resulted.

Example 3

Cotton fabrics treated as in Example 2, except that the methanolic solution of epichlorohydrin and ammonia was aged 2.5 months before being made into the 20% aqueous padding solution for step 1.

| Wt. gain percent | Crease recovery angles, deg. (W+F) | |
|---|---|---|
| | Dry | Wet |
| 5.8 | 242 | 257 |
| 6.7 | 260 | 247 |
| 7.1 | 290 | 250 |
| Control | 193 | 186 |

Example 4

Cotton fabrics treated as in Example 3, except that a 10% aqueous solution of active ingredients was used in step 1 and a 5% aqueous NaOH solution was used in step 2.

| Wt. gain percent | Crease recovery angles, deg. (W+F) | |
|---|---|---|
| | Dry | Wet |
| 2.7 | 199 | 235 |
| 3.5 | 242 | 244 |
| Control | 193 | 186 |

Example 5

Cotton fabric treated same as in Example 3, except that the methanolic solution of active ingredients had been aged only 2 months. A fabric of 6% weight gain possessed dry crease angles of only 204° and wet angles of 250°.

Example 6

Cotton fabric treated same as in Example 5, except that methanolic solution had been aged 3 months. The fabric possessed a 5.8% weight gain, dry crease angles of 243 and wet crease angles of 257 (W+F)°.

Example 7

Cotton fabric treated same as in Example 3, except that the methanolic solution of active ingredients had been heated at reflux temperatures until the chloride ion content was 11.8%. Minimum dry crease angles of fabrics treated with this solution was only 210 (W+F)°.

Example 8

Cotton fabrics treated same as in Example 3, except that the methanolic solution of active ingredients was solvent stripped in a rotary evaporator at 75–80° C. to give a syrup of 11.5% ionic chloride. All fabrics finished with these heat-modified solutions possessed wet crease recovery angles of approximately 250 (W+F)°, but dry crease recovery angles less than that of the control fabric.

Example 9

Cotton fabrics treated same as in Example 3, except that the ageing process of ammonia and epichlorohydrin at a 1:3 mole ratio took place in an aqueous medium. Fabrics of weight gains varying from 3 to 10% resulted covering a range of wet crease angles from 230 to 300°, but increased dry recovery angles over that of the control were never realized.

We claim:
1. A process of preparing a crosslinking reagent for cellulose comprising aging a solution consisting of a 1:3 mole ratio of ammonia and epichlorohydrin dissolved in methanol at room temperature for at least 1800 hours.
2. The product produced by the process of claim 1.

References Cited

UNITED STATES PATENTS 3,102,112   8/1963   Carter et al.

FOREIGN PATENTS 743,563   11/1943   Germany.

CHARLES B. PARKER, *Primary Examiner.*

R. L. RAYMOND, *Assistant Examiner.*

U.S. Cl. X.R.

8—116.2; 260—584, 585